(12) United States Patent
Schneider

(10) Patent No.: US 8,707,286 B2
(45) Date of Patent: Apr. 22, 2014

(54) UNIQUE CONTEXT-BASED CODE ENHANCEMENT

(75) Inventor: Michael Schneider, Angelbachtal (DE)

(73) Assignee: SAP AG, Walldorf (DE)

(*) Notice: Subject to any disclaimer, the term of this patent is extended or adjusted under 35 U.S.C. 154(b) by 949 days.

(21) Appl. No.: 12/334,343

(22) Filed: Dec. 12, 2008

(65) Prior Publication Data

US 2010/0153915 A1   Jun. 17, 2010

(51) Int. Cl.
*G06F 9/44* (2006.01)

(52) U.S. Cl.
USPC ........... 717/168; 717/110; 717/169; 717/170; 717/154; 717/143; 717/140

(58) Field of Classification Search
USPC ......... 717/104, 136, 140, 162, 110–111, 127, 717/154, 168–178
See application file for complete search history.

(56) References Cited

U.S. PATENT DOCUMENTS

| | | | |
|---|---|---|---|
| 5,717,925 A | 2/1998 | Harper et al. | |
| 5,931,909 A | 8/1999 | Taylor | |
| 6,339,838 B1 * | 1/2002 | Weinman, Jr. | 717/104 |
| 6,466,999 B1 | 10/2002 | Sliger et al. | |
| 6,598,223 B1 | 7/2003 | Vrhel, Jr. et al. | |
| 6,668,375 B1 | 12/2003 | Leovac | |
| 6,853,978 B2 | 2/2005 | Forth et al. | |
| 6,883,168 B1 | 4/2005 | James et al. | |
| RE38,762 E | 7/2005 | O'Connor | |
| 6,968,538 B2 | 11/2005 | Rust et al. | |
| 7,003,110 B1 | 2/2006 | Jakobdsson et al. | |
| 7,076,496 B1 | 7/2006 | Ruizandrade | |
| 2002/0178434 A1 * | 11/2002 | Fox et al. | 717/106 |
| 2003/0037325 A1 | 2/2003 | Hargrove et al. | |
| 2003/0197727 A1 | 10/2003 | Milius | |
| 2003/0200149 A1 | 10/2003 | Gonzalez et al. | |
| 2003/0212990 A1 | 11/2003 | Brodkorb et al. | |
| 2003/0225937 A1 | 12/2003 | Reiss et al. | |
| 2004/0015843 A1 * | 1/2004 | Quan, Jr. | 717/110 |
| 2004/0181775 A1 | 9/2004 | Anonsen et al. | |
| 2005/0125773 A1 * | 6/2005 | Hawley et al. | 717/109 |
| 2005/0160409 A1 | 7/2005 | Schmid-Lutz et al. | |
| 2006/0015856 A1 * | 1/2006 | Lotter | 717/136 |
| 2006/0026583 A1 * | 2/2006 | Remmel et al. | 717/162 |
| 2006/0026586 A1 | 2/2006 | Remmel et al. | |
| 2006/0136867 A1 * | 6/2006 | Schneider et al. | 717/106 |
| 2006/0200814 A1 | 9/2006 | Kontinen et al. | |
| 2007/0074127 A1 | 3/2007 | Acker et al. | |
| 2007/0157181 A1 * | 7/2007 | Crasovan et al. | 717/140 |
| 2009/0112839 A1 * | 4/2009 | Fisher et al. | 707/5 |
| 2010/0125824 A1 * | 5/2010 | Kobayashi et al. | 717/104 |

* cited by examiner

*Primary Examiner* — Lewis A Bullock, Jr.
*Assistant Examiner* — Tina Huynh
(74) *Attorney, Agent, or Firm* — Blakely, Sokoloff, Taylor & Zafman

(57) ABSTRACT

Unique context-based code enhancement of the core functionality of standard source code objects is performed at any position in the code. Desired insertion/replacement position (s) input by a user trigger the generation of a unique context for an enhancement. The unique context is based on characteristics of the code in the standard source code objects, such as the statements proximate to the insertion/replacement position(s). The unique context is associated with one or more extension source code objects that, when integrated into the existing source code at the insertion/replacement position(s), will provide the enhancement. At compile-time, the unique context used to unambiguously locate the insertion/replacement position(s). The extension source code objects can include industry or customer extensions, add-ons, plug-ins, and the like.

12 Claims, 5 Drawing Sheets

UNIQUE CONTEXT-BASED CODE ENHANCEMENT

TECHNICAL FIELD

The present invention relates to the field of computer software technologies. In particular, the present invention relates to facilitating enhancements to existing software.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, SAP AG (Walldorf, Germany), All Rights Reserved.

BACKGROUND AND RELATED ART

Enterprise software providers offer technologies that allow developers to build and deploy software applications rapidly. Rather than building software applications from scratch, developers start with existing software packages that provide certain core functions, and then enhance them to meet specific requirements.

For example, enterprise software provider SAP AG (Walldorf, Germany), the assignee of the present patent application, provides adaptable platform technologies, such as SAP NetWeaver®, that allow businesses to enhance core functions with various industry-specific extensions, add-on development, and/or custom modifications. An enhancement and switch framework in SAP's adaptable platform provides the ability to dynamically integrate multiple extensions and/or modifications without altering the original code of the core functions, i.e. the standard source code objects. The various extensions and modifications are separately stored and maintained as extension source code objects or source code plug-ins, add-ons, and the like.

One of the constraints of the existing enhancement framework is that the enhancement of the original, standard source code objects is supported only at predefined positions in the code. This limits the ability of developers to enhance the core functions.

SUMMARY

According to one aspect of the invention, a method and system is provided to facilitate enhancing the functionality of existing source code at any position in the code, including before, after and within a statement in the code. The method and system advantageously eliminates the need to predefine the position in the code at which enhancing the functionality is permitted.

According to one aspect of the invention, at design-time, the method and system provides an interface for receiving a user input indicating a position in the existing source code at which the user desires to enhance the functionality. The method and system further provides logic to generate and store a unique context that can be subsequently used to unambiguously locate the user-indicated position within the existing source code. The method and system further provides logic to associate the generated unique context with one or more extension source code objects that, when integrated into the existing source code at the user-indicated position, will support the enhanced functionality, including industry or customer extensions, add-ons, plug-ins, and the like.

According to one aspect of the invention, the generated unique context is based on characteristics of the existing source code proximate to the user-indicated position. In one embodiment, the characteristics of the existing source code proximate to the user-indicated position includes one or more statements comprising a contiguous portion of code immediately adjacent to the user-indicated position, including immediately before or after the user-indicated position.

According to one aspect of the invention, at compile-time, the method and system dynamically integrates the extension source code objects into the executable byte code of the existing source code in accordance with the user-indicated position represented by the associated unique context. Advantageously, should the existing source code be subsequently upgraded, the extension source code objects may continue to be dynamically integrated into the executable byte code of the upgraded existing source code as long as the characteristics of the existing source code from which the associated unique context was generated are still present in the upgraded existing source code.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods and systems.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and system to facilitate enhancing the functionality of existing source code at any position in the code will be described. Specific details of embodiments of the present invention will be described in order to provide a thorough understanding. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system, or any apparatus for carrying out the method and system, is implemented in a client computer, server computer, or as a software routine, hardware circuit, firmware, or a combination thereof.

Parts of the description will be presented using terminology commonly employed by those skilled in the art to convey the substance of their work to others skilled in the art, including terms of operations performed by a computer system operating an enterprise platform, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
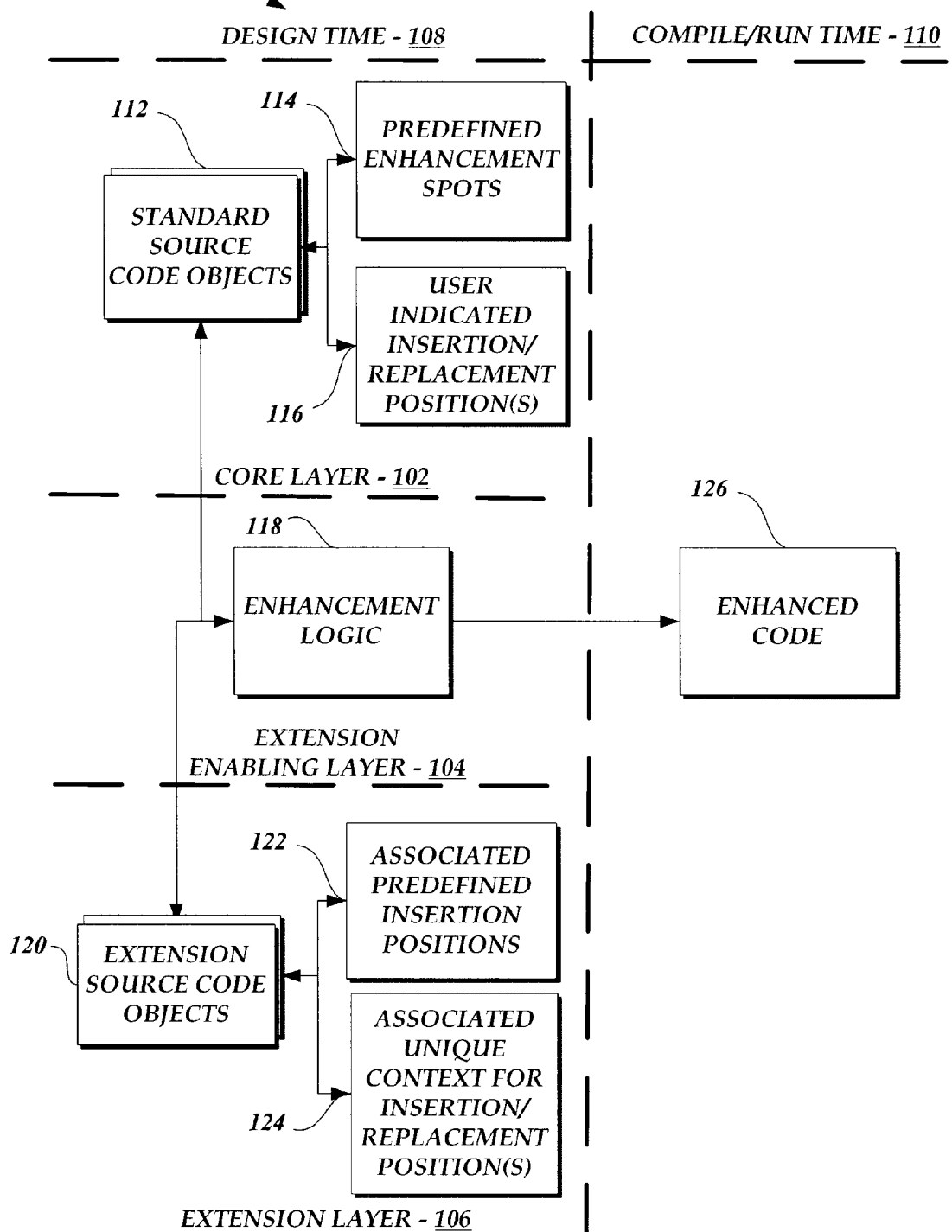
FIG. 1 is a block diagram illustrating certain aspects of a system for providing unique context-based code enhancement in accordance with an embodiment of the invention.

FIG. 1 is a block diagram illustrating certain aspects of a system for providing unique context-based code enhancement in accordance with an embodiment of the invention. As shown, in one embodiment, a unique context-based code enhancement system 100 comprises several layers, including but not limited to, a core layer 102, an extension enabling layer 104, and an extension layer 106. In a typical embodiment, the layers operate as part of an enterprise software development and operation platform operating on a computer in an enterprise computing environment. Standard source code objects 112 residing in the core layer 102 provide core functionality supporting business processes performed in the enterprise computing environment. Extension source code objects 120 residing in a separate extension layer 106 provide extended functionality that enhances the core functionality. The extension source code objects 120 typically add new coding to, or replace portions of the standard source code objects 112. Examples of extension source code objects 120 include, but are not limited to, industry-specific extensions, add-on modules, and custom source code plug-ins.

At design time 108, certain predefined enhancement spots 114 provide developers with a mechanism to explicitly designate certain positions in the code at which enhancements to the core functionality are permitted. In some cases, however, the predefined enhancement spots 114 are inadequate, and developers may wish to enhance the core functionality at other positions in the code not so designated. Thus, in one embodiment, an enhancement logic 118 of the extension enabling layer 104 provides an interface for receiving a user input to mark a user-indicated position 116 at which to enhance the core functionality, including, but not limited to, insertion positions at which to insert an extension source code object 120 into the standard source code object 112, and/or beginning and ending replacement positions that span a portion of code in the standard source code object 112 that is to be replaced with the extension source code object 120 (or possibly to be removed or otherwise inactivated).

At design time 108, upon receiving the user input to mark the user-indicated position 116 at which to enhance the core functionality provided by the standard source code object 112, the enhancement logic 118 generates a unique context 124 based on characteristics of the standard source code object 112 proximate to the user-indicated position(s) 116, as will be described in further detail below in the description of FIG. 2. In a typical embodiment, the characteristics upon which the unique context 124 is based include one or more statements in the standard source code object 112 from which the user-indicated position(s) 116 may be unambiguously identified.

The generated unique context 124 can be subsequently used during compile-time 110 to unambiguously locate the user-indicated position(s) 116 within the standard source code object 112, e.g., the insertion position at which to insert an extension source code object 120, or the beginning and ending replacement positions of the portion of the standard source code object 112 to be replaced with the extension source code object 120. The enhancement logic 118 of the extension enabling layer 104 further associates the generated unique context 124 with one or more of the extension source code objects 120 that provide the enhanced functionality.

In one embodiment, at compile-time 110, the enhancement logic 118 of the extension enabling layer 104 detects whether extension source code objects 120 are available to enhance the core functionality and, if so, whether a particular extension source code object 120 has an associated unique context 124. The enhancement logic 118 further determines whether the characteristics of the standard source code object 112 from which the associated unique context 124 was originally generated is still present in the current version of the standard source code object 112. If so, the enhancement logic 118 uses the associated unique context 124 to unambiguously identify the user-indicated position 116 at which to enhance the standard source code object 112.

In one embodiment, at compile-time 110, the enhancement logic 118 integrates the extension source code object 120 into the standard source code object 112 in accordance with the unambiguously identified user-indicated position(s) 116. In this manner, the core functionality provided in the standard source code object 112 is able to be enhanced with the additional or replacement functionality of the extension source code object 120 at any position within the original standard source code object 112, and without having to designate or keep track of a predefined enhancement spot 114 for that position.

Figure 2:
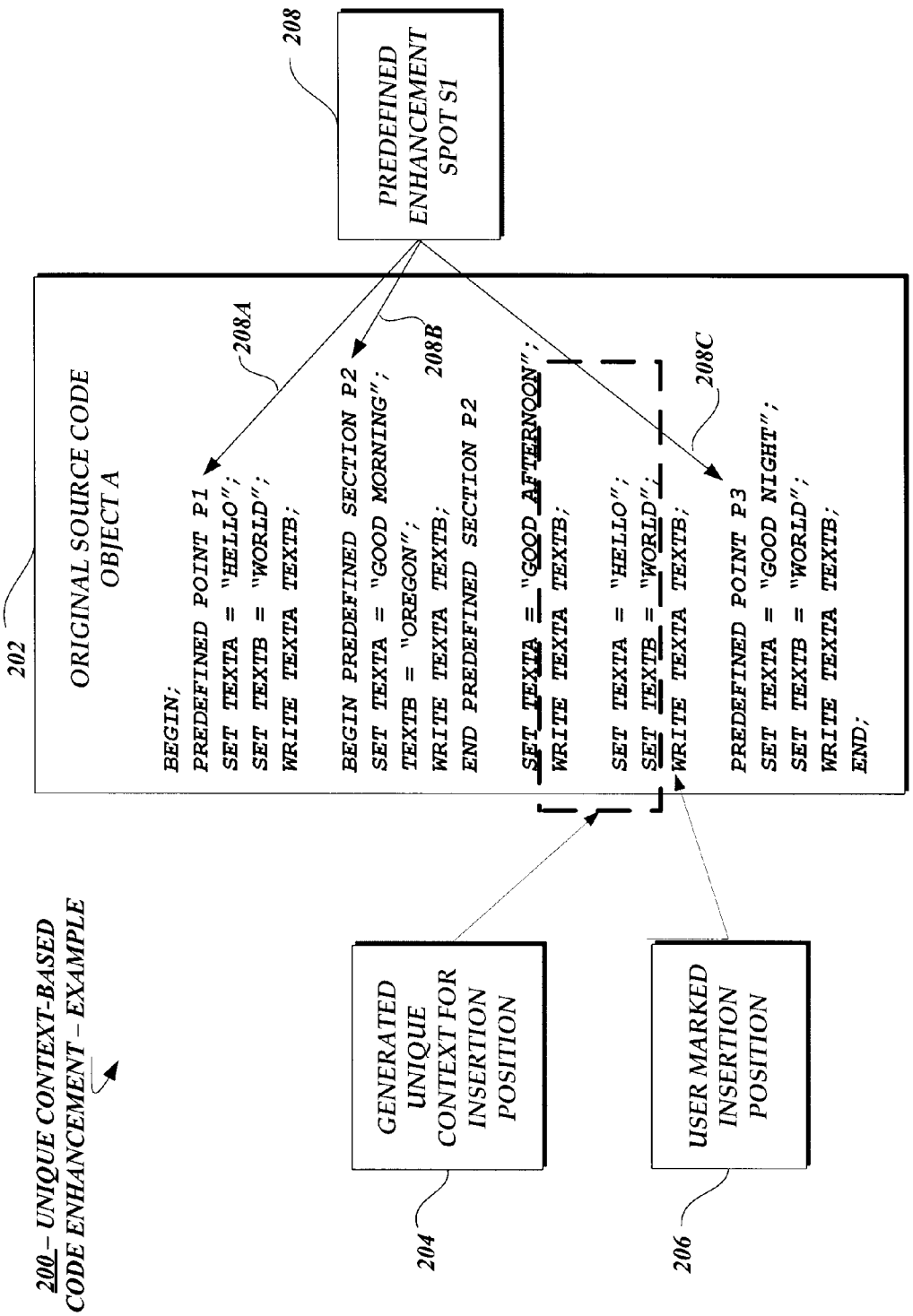
FIG. 2 is a block diagram illustrating in further detail certain aspects of a system for providing unique context-based code enhancement in accordance with an embodiment of the invention.

FIG. 2 is a block diagram illustrating in further detail certain aspects of a system for providing unique context-based code enhancement in accordance with an embodiment of the invention. In the illustrated example 200, an original source code object A 202 comprises numerous source code statements. Using the previous enhancement framework, a predefined enhancement spot S1 208 has been provided to manage certain positions (e.g., Predefined Point P1 208A and Predefined Point P3 208C) within the source code object 202 that have been explicitly predefined as positions at which code enhancements can be inserted, or as portions of code (e.g., the code spanned by the Begin and End Predefined Section P2 208B) that can be replaced with a code enhancement. The managed positions defined by the predefined enhancement spot S1 208 are then stored as predefined insertion positions 122 at which enhancements are permitted, and that are associated with particular extension source code objects 120.

In this example 200, however, a user wishes to enhance the original source code object A 202 at a user-marked insertion position 206 immediately prior to the fourth occurrence of the source code statement WRITE TEXTA TEXTB, which is not one of the predefined insertion positions 122 at which enhancements are permitted. In response to the user marking the insertion position 206, the enhancement logic 118 of the new enhancement framework generates a unique context 204 for the insertion position, shown in FIG. 2 as the three source code statements that immediately precede the user-marked insertion position 206, also referred to as the user-indicated position 116 illustrated in FIG. 1. The three source code statements are one example of a characteristic from which the user-marked insertion position 206 may be unambiguously identified, because it is the only portion of code in which those particular three source code statements appear in that exact order.

Note that the two source code statements that immediately precede the user-marked insertion position 206 (SET TEXTA="HELLO" and SET TEXTB="WORLD" are not unique, in that they appear identically in two different portions of the code. But adding the third statement (the third occurrence of WRITE TEXTA TEXTB) to the context makes the context unique relative to all of the other source code statements comprising the source code object A 202. The number of contiguous code statements (or portions of a statement when the user-marked insertion position occurs within a statement) needed to generate a unique context will, of course, vary greatly from one source code object to the next. It should be understood, of course, that code used in the example 200 is for illustration purposes only, and that embodiments of the invention may be practiced with other types of source code or other characteristics (other than code statements or portions of code statements) of the source code object 202 without departing from the scope of the claimed embodiments that follow.

Figure 3:
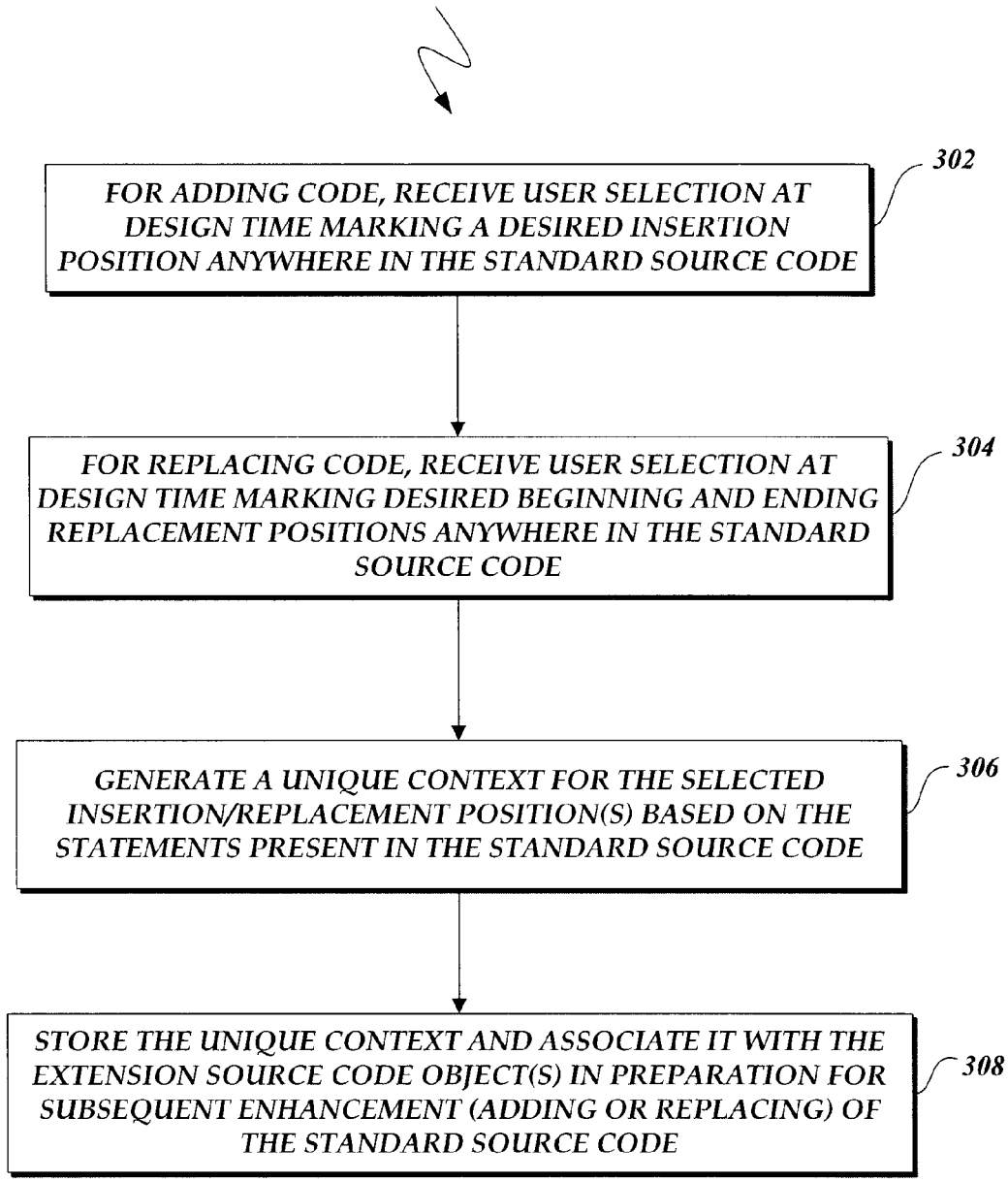
FIG. 3 is a flow diagram illustrating certain aspects of methods to be performed in a system for providing unique context-based code enhancement implemented in accordance with one embodiment of the invention.
Figure 4:
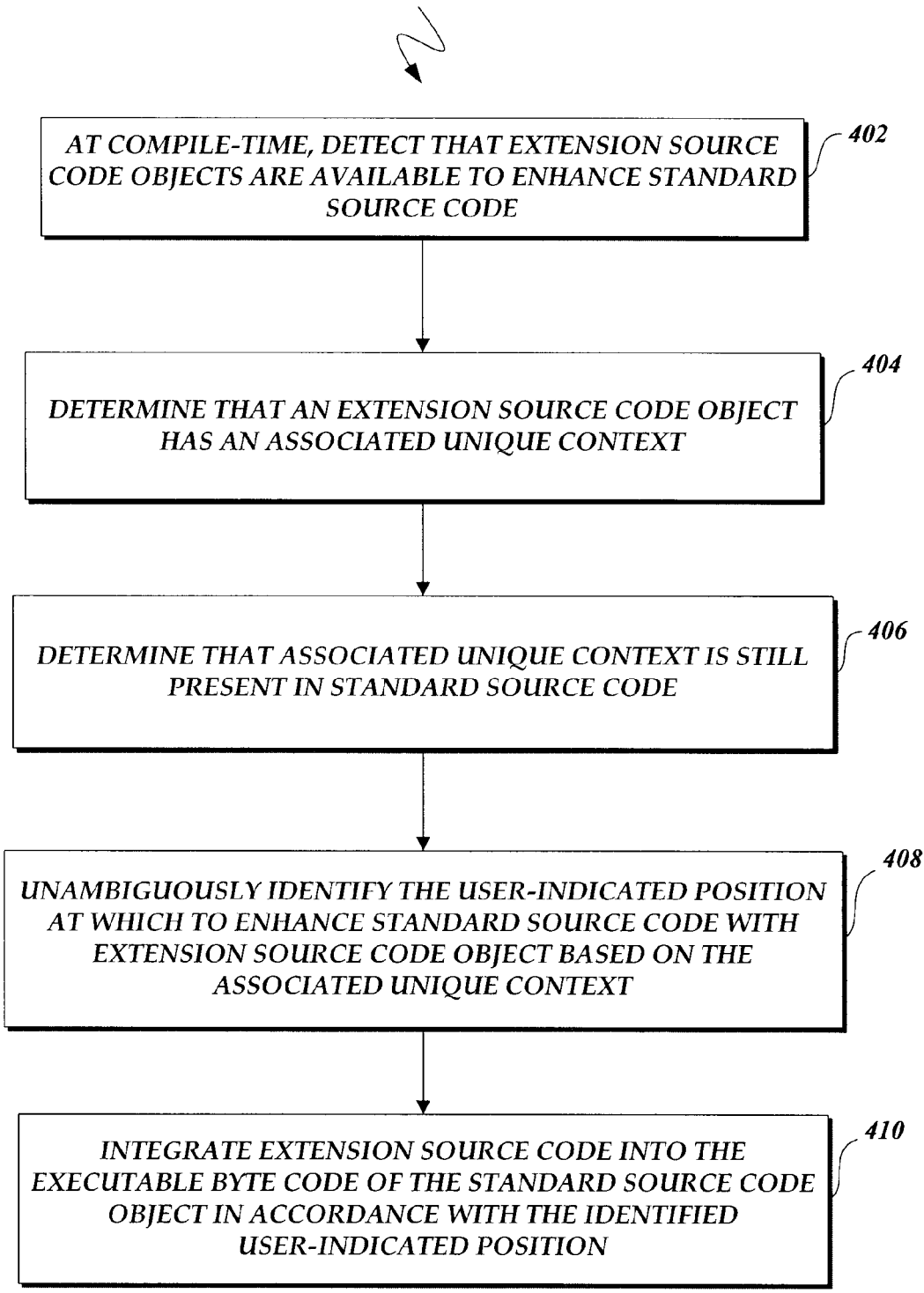
FIG. 4 is a flow diagram illustrating certain other aspects of methods to be performed in a system for providing unique context-based code enhancement implemented in accordance with one embodiment of the invention.

FIGS. 3-4 are flow diagrams illustrating certain aspects of methods to be performed in a system for providing unique context-based code enhancement implemented in accordance with one embodiment of the invention. In FIG. 3 a design-time flow of a method 300 for unique context-based enhancement is illustrated, beginning with process block 302, in which, for adding new code, the method 300 receives a user selection marking a desired insertion position anywhere in a standard source code object, typically between two code statements present in the source code object. In one embodiment, the desired insertion position may be within a code statement present in the source code object, such as when the user desires to add parameters to an existing code statement present in the source code object. Alternatively, or in addition to, at process block 304, the method 300 receives a user selection marking a desired beginning and ending replacement positions anywhere in a standard source code object, typically a sequence of statements present in the standard source code object that is to be replaced.

In one embodiment, upon receiving the user selections in process blocks 302 and/or 304, the method 300 continues at process block 306 to generate a unique context for the selected insertion/replacement position(s), where the unique context is based on certain characteristics of the source code object. In one embodiment, the characteristics are typically the code statements present in the standard source code object, particularly those statements immediately proximate to the insertion/replacement position(s), including those statements before and/or after to the insertion/replacement position(s).

In one embodiment, upon generating the unique context in process block 306, the method 300 concludes the design-time flow at process block 308 by storing the generated unique context, typically in a repository in the extension layer 106 (see FIG. 1) and associating the stored unique context with one or more extension source code objects that provide the code enhancements. The association is performed in preparation for the subsequent enhancement of the standard source code object, as will be described in further detail in the description of FIG. 4 that follows.

In FIG. 4, a compile-time flow of a method 400 for unique context based enhancement is illustrated, beginning with process block 402, in which the method 400 detects that extension source code objects are available to enhance standard source code objects. At process block 404, the method 400 determines that a particular extension source code object has an associated unique context for a particular standard source code object. At process block 406, the method 400 scans the standard source code object to determine whether the characteristics upon which the associated unique context was based is still present in the standard source code object. If so, the method 400 continues at process block 408 to determine whether the associated unique context unambiguously identifies one position at which to enhance the standard source code object, i.e. the original user-indicated position. If so, the method 400 concludes at process block 410, integrating the extension source code into the executable byte code of the standard source code in accordance with the unambiguously identified insertion/replacement position(s). In this manner, the original standard source code is able to be enhanced at any position without having to predefine the position.

Figure 5:
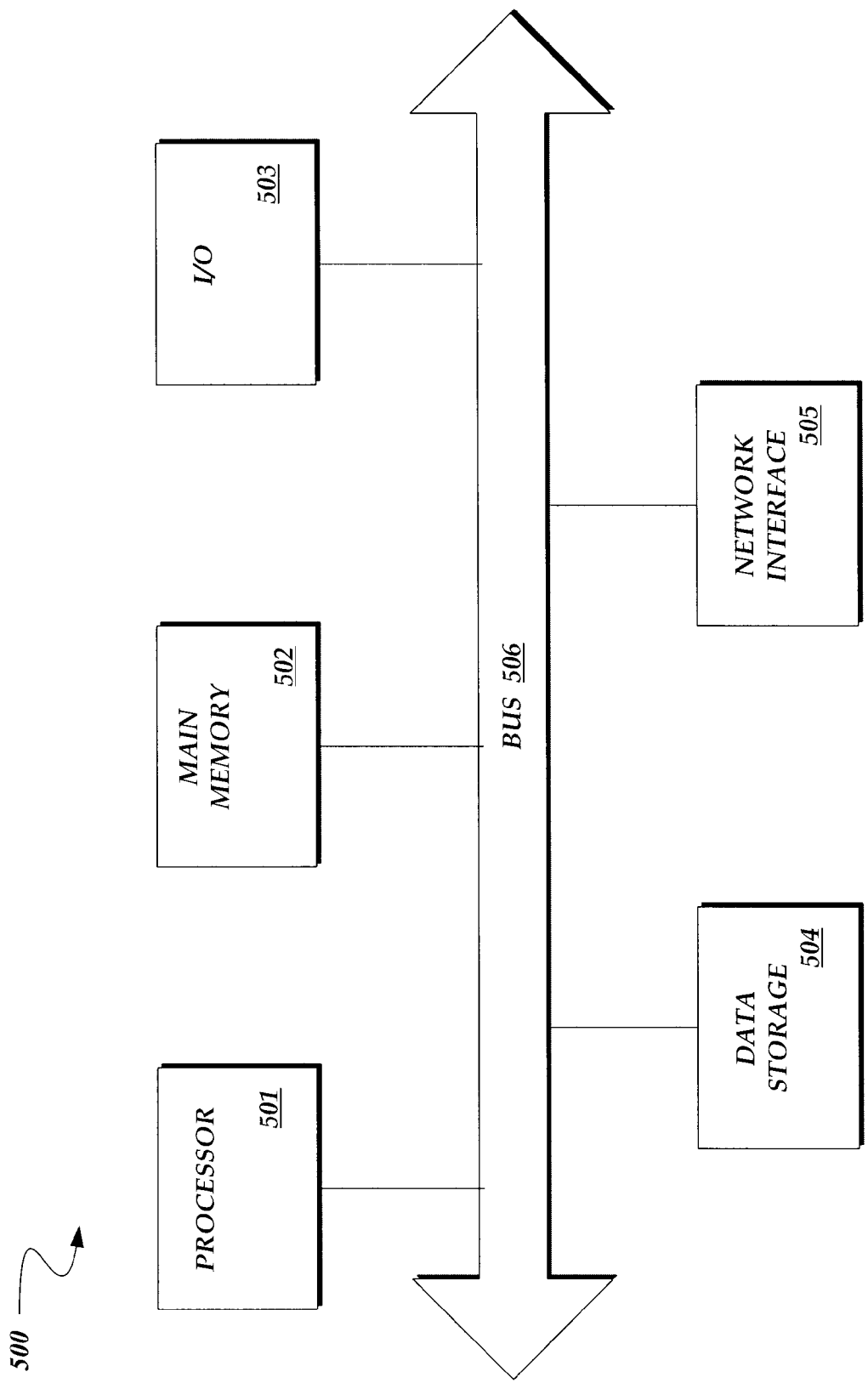
FIG. 5 is a block diagram illustrating one embodiment of a suitable computing environment in which certain aspects of the methods and systems illustrated in FIGS. 1-4 may be practiced.

FIG. 5 illustrates one embodiment of a suitable computing environment in which certain aspects of the invention illustrated in FIGS. 1-4 may be practiced. In one embodiment, the method and system for providing unique context-based code enhancement may be implemented on a computer system 500 having components 501-506, including a processor 501, a memory 502, an Input/Output device 503, a data storage 504, and a network interface 505, coupled to each other via a bus 506. The components perform their conventional functions known in the art and provide the means for implementing embodiments of the methods and systems for unique context-based code enhancement. Collectively, these components represent a broad category of hardware systems, including but not limited to general purpose computer systems and specialized enterprise client and server systems.

In one embodiment, the memory component 502, may include one or more of random access memory (RAM), and nonvolatile storage devices (e.g., magnetic or optical disks) on which are stored instructions and data for use by processor 501, including the instructions and data that comprise the various layers of the unique context-based code enhancement system, including the core layer 102, the extension enabling layer 104, and the extension layer 106, as well as the layer components, such as the standard source code objects 112, the insertion/replacements positions 116, the extension source code objects 120, the associated unique context for the insertion/replacement positions, and the enhanced code 126.

It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, network/communication interfaces, etc.

In the illustrated embodiment of FIG. 5, the methods and systems for providing unique context-based code enhancement in accordance with one embodiment of the invention as discussed above may be implemented as a series of software routines executed by computer system 500. The software routines may comprise a plurality or series of instructions, code sequences, configuration information, or other data to be accessed and/or executed by a processing system such as one or more of processor 501. Initially, the series of instructions, code sequences, configuration information, or other data may be stored on data storage 504 and transferred to memory 502 via bus 506. It is to be appreciated that the series of instructions, code sequences, configuration information, or other data can be stored a data storage 504 using any conventional computer-readable or machine-accessible storage medium, such as a diskette, CD-ROM, magnetic tape, DVD, ROM, etc.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for providing unique context-based code enhancement. From the foregoing description, those skilled in the art will recognize that many other variations of the present invention are possible. In particular, while the present invention has been described as being implemented in certain layers of an enhancement framework of an adaptable application platform, some of the logic may be distributed in other components of enterprise computing environment. Thus, the present invention is not limited by the details described. Instead, the present invention can be practiced with modifications and alterations within the spirit and scope of the appended claims.

What is claimed is:

1. A computer-implemented method for enhancing functionality of a source code object, the method comprising:
    receiving an input from a user indicating a position within a source code object at which the user wishes to enhance the functionality of the source code object, the source code object subject to being upgraded, an upgraded source code object differing at least in part from the source code object;
    generating a unique context for the indicated position based on a characteristic present in the source code object, the characteristic including at least one statement of code in the source code object that is proximate to the indicated position, the generated unique context unambiguously identifying a same indicated position within both the source code object and the upgraded source code object for as long as the characteristic present in the source code object is still present in the upgraded source code object;
    associating the generated unique context with a code enhancement;
    scanning the upgraded source code object to determine whether the characteristic upon which the unique context was generated is still present;
    unambiguously identifying the position within the upgraded source code object where the characteristic is still present as the same indicated position within both the source code object and upgraded source code object; and
    compiling the code enhancement into an executable version of the upgraded source code object at the same indicated position unambiguously identified based on the generated unique context associated with the code enhancement.

2. The computer-implemented method of claim 1, further comprising:
    determining that an upgraded source code object is not available; and compiling the code enhancement into an executable version of the source code object at the indicated position for which the unique context associated with the code enhancement was generated.

3. The computer-implemented method of claim 1, wherein the code enhancement is one of an extension source code object, a source code plug-in, and an add-on module.

4. The computer-implemented method of claim 1, wherein the indicated position is one of an insertion position and two replacement positions, wherein the insertion position is used to locate where to add the code enhancement and the two replacement positions are used to locate a section of code spanned by the two replacement positions, the section of code to be replaced by the code enhancement.

5. A system for enhancing a core functionality of a software package, the system comprising:
    an interface for receiving an input indicating a position within a source code object at which the user wishes to enhance the functionality of the source code object, the source code object subject to being upgraded, an upgraded source code object differing at least in part from the source code object;
    a repository in which to store the source code object, a code enhancement, and a unique context for the indicated position within the source code object, the unique context unambiguously identifying a same indicated position within both the source code object and the upgraded source code object for as long as a characteristic present in the source code object and upon which the unique context is based is still present in the upgraded source code object, the characteristic including at least one statement of code in the source code object that is proximate to the indicated position;
    a processor in which to perform instructions for:
        generating the unique context for the indicated position upon receiving the input, wherein generating is based on the characteristic of the source code object;
        associating the generated unique context with the code enhancement;
        scanning the upgraded source code object to determine whether the characteristic upon which the unique context was generated is still present;
        scanning the upgraded source code object to determine whether the characteristic present in the source code object from which the unique context was generated is still present in the upgraded source code object;
        unambiguously identifying the same indicated position within the upgraded source code object from the generated unique context associated with the code enhancement; and
        compiling the code enhancement into an executable version of the upgraded source code object at the same indicated position unambiguously identified from the generated unique context associated with the code enhancement.

6. The system of claim 5, wherein the processor further performs instructions for:
    determining that an upgraded source code object is not available and compiling the code enhancement into an executable version of the source code object at the indicated position for which the generated unique context associated with the code enhancement was generated.

7. The system of claim 5, wherein the code enhancement is one of an extension source code object, a source code plug-in, and an add-on module.

8. The system of claim 5, wherein the indicated position is one of an insertion position and two replacement positions, wherein the insertion position is used to locate where to add the code enhancement and the two replacement positions are used to locate a section of code spanned by the two replacement positions, the section of code to be replaced with the code enhancement.

9. A non-transitory computer-readable medium encoded with computer-executable instructions for performing a method for enhancing source code, the method comprising:
receiving a user input indicating a position in existing source code where the user wants to enhance functionality, the existing source code subject to being upgraded, an upgraded version of the existing source code differing at least in part from the existing source code;
generating and storing a unique context for the indicated position based on a characteristic present in the existing source code proximate to the indicated position in the existing source code;
associating the generated unique context with a code enhancement that enhances the functionality of the existing source code;
scanning the upgraded source code object to determine whether the characteristic upon which the unique context was generated is still present;
unambiguously identifying a same indicated position in the upgraded version of the existing source code corresponding to the indicated position in existing source code based on the stored generated unique context; and
compiling the upgraded version of the existing source code and the code enhancement into an integrated executable object in accordance with the unambiguously identified same indicated position in the upgraded version of the existing source code, the integrated executable object having enhanced functionality.

10. The non-transitory computer-readable medium of claim 9, wherein unambiguously identifying the same indicated position in the upgraded version of the existing source code corresponding to the indicated position in existing source code based on the stored generated unique context includes determining that the characteristic present in the existing source code proximate to the indicated position for the stored generated unique context is still present in the upgraded version of the existing source code.

11. The non-transitory computer-readable medium of claim 9, wherein generating the unique context for the indicated position based on the characteristic present in the existing source code proximate to the indicated position is determining a least number of statements proximate to the indicated position that would be needed to unambiguously identify the indicated position location, wherein the least number of statements is determined relative to other statements present in the existing source code.

12. The non-transitory computer-readable medium of claim 9, wherein the code enhancement is contained in one of an extension source code object, a source-code plug-in, and an add-on module.

* * * * *